(No Model.)
W. O. WAY.
BURNISHING MACHINE.
No. 341,524. Patented May 11, 1886.
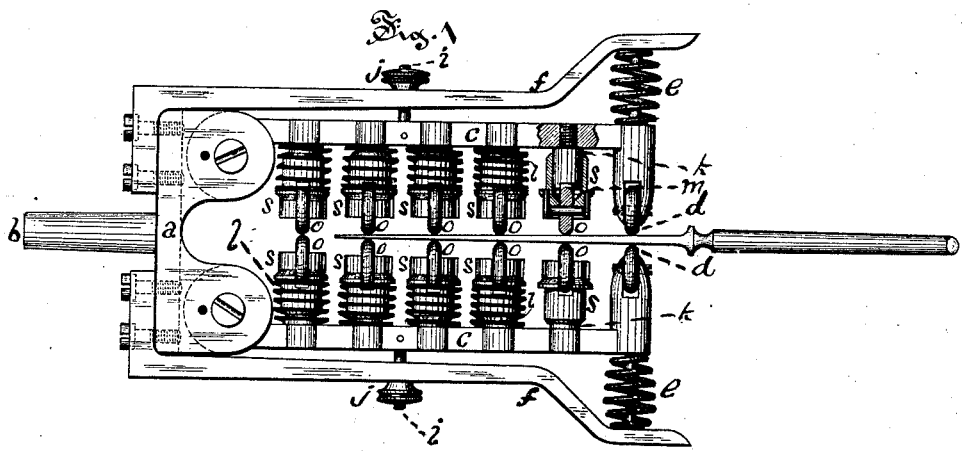
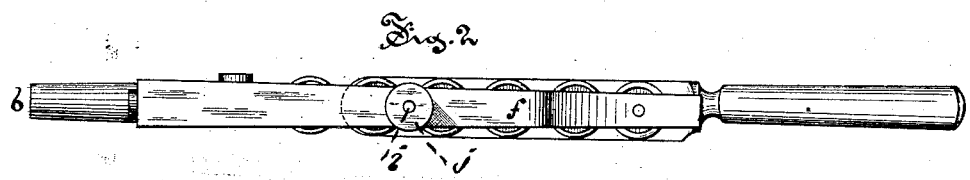
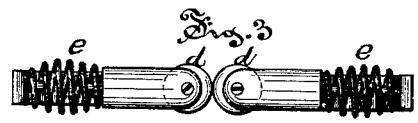
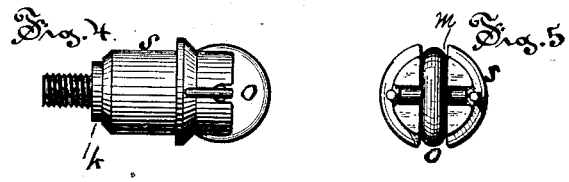
Witnesses
H. R. Williams.
A. C. Tanner.
Inventor.
William O. Way
By W. E. Simonds
Atty.
N. PETERS, Photo-Lithographer, Washington, D. C.

UNITED STATES PATENT OFFICE.

WILLIAM O. WAY, OF NEWINGTON, CONNECTICUT.

BURNISHING-MACHINE.

SPECIFICATION forming part of Letters Patent No. 341,524, dated May 11, 1886.

Application filed February 4, 1885. Serial No. 154,867. (No model.)

*To all whom it may concern:*

Be it known that I, WILLIAM O. WAY, of Newington, in the county of Hartford and State of Connecticut, have invented a certain new and useful Improvement in Burnishing Machinery, of which the following is a description, reference being had to the accompanying drawings, where—

Figure 1 is a top view of the parts wherein the improvement resides. A spiral spring is omitted from the sleeve of one of the burnish-stocks, for the purpose of clearly showing the barrel, and another of the burnish-stocks with its sleeve and burnish is sectioned for the purpose of showing interior construction. Fig. 2 is a side view of the device represented in Fig. 1. Fig. 3 is a front view of the parts shown in Fig. 1, with the knife not present. Fig. 4 is an enlarged detail view, which may be called a "side view," of one of the burnish-stocks, sleeve thereon, and its burnish. Fig. 5 is what may be called a "front view" of the parts shown in Fig. 4.

The mechanism herein described is intended for burnishing surfaces like the sides of a knife-blade.

The mechanism shown in the annexed drawings is intended for burnishing both sides of a knife-blade at the same time.

In order to make the operation of this present improvement intelligible without presenting an undue number of drawings, I will refer briefly to certain prior patents of mine.

Letters Patent to myself for burnishing machinery, No. 235,921, dated December 28, 1880, show a machine of a general nature suitable for use in connection with this present improvement. Such machine embodies a reciprocating cross-head carrying pivoted burnisher-bearing arms. The cross-head shown in the drawings of this present patent is intended to be reciprocated in substantially the same manner as the cross-head is reciprocated in the machine of said Patent No. 235,921.

Letters Patent to me, No. 293,826, dated February 19, 1884, show an improved cross-head more nearly approximating to my present improvement than the one shown in my said Patent No. 235,921. My said later Patent No. 293,826 also shows a device for grasping and holding a knife by the handle while the blade is being burnished, and the use of my present improvement contemplates the use of such a knife-holding device or some practical equivalent thereof.

The machine shown in my said later patent is designed for burnishing the sides of a knife-blade. Its commonest use is for burnishing the sides of a steel knife-blade electroplated with silver.

The most obvious mode of using the device shown in my said later patent is to have the burnishers make a stroke substantially the full length of the blade; but in so using that machine there is a tendency at times to cause the silverplating to "strip." That difficulty is entirely cured in the use of the present improvement.

In the accompanying drawings, the letter $a$ denotes a cross-head having a pintle, $b$, for insertion into the end of such a reciprocating piston as is shown in my said Patent No. 235,921, whereby the burnishers will be given the rapid horizontal and the slow vertical reciprocation necessary to make them cover the whole surface to be burnished.

The letter $c$ denotes two similar burnisher-bearing arms pivoted in the cross-head. Each of these arms $c$ is provided with a rotarily-hung wheel-burnisher, $d$, fixed to the arm. The arms $c$ are pressed inward by the helical springs $e$, which abut at the outer end against arms $f$, extending from and wholly supported by the cross-head. The arms $f$ extend alongside and back of the arms $c$.

The letter $i$ denotes adjusting-screws jointed to the arms $c$. $j$ denotes thumb-nuts thereon, by which the arms $c$ may be regulated as to the amount of their permissible inward play. By unscrewing the nuts $j$ the springs $e$ are permitted to push the arms $c$ inward, and by screwing up the nuts $j$ the arms $c$ are pulled outward or apart.

The arms $f$ are not absolutely rigid, but are stiff enough to be practically rigid, so far as any function hereinbefore ascribed to them is concerned.

It has already been mentioned that each of the arms $c$ bears a rotarily-hung wheel-burnisher fixed thereto. Each of these arms $c$ also bears a series of independently-acting burnishers set in the same horizontal line, and the length of the stroke given them is such that the path of each overlaps the path of its next neighbor. When it is said that each of these series of burnishers is "independently acting," it is meant that they are movable with reference to the arms c, and that each is pressed inward to its work by a separate spring of its own. These series of independently-acting burnishers are denoted by the letter o. Each of them is rotarily hung in a sleeve or socket, s, which is supported on a stock or stud, k, screwed into an arm, c. A spiral spring, l, interposed between arm c and a shoulder on the socket, urges each burnisher o independently to its work. Each burnisher o extends back into a mortise, m, in the end of stud k.

It will be observed that the front ends of the arms f are rounded off on the inside into curved surfaces. These curved surfaces are cams which co-operate with stationary posts in the manner shown in my said Patent No. 293,826, to turn the burnishers d suddenly outward at the proper time, with a curved movement corresponding with the curve by which the blade of the knife rises to meet the bolster, the arms f being sufficiently elastic to permit this action.

I claim as my improvement—

1. The combination, in a burnishing-machine, of a reciprocating arm or bar, carrying a series of studs, a series of sockets on said studs, each socket carrying its own burnisher, and a spring upon each socket arranged to force the burnisher toward the surface to be operated upon, all substantially as described, and for the purpose set forth.

2. In combination, in a burnishing-machine, a reciprocating arm, c, pressed toward the work by a spring, a burnisher, d, fixed in its relation to said arm, and a series of independently-acting burnishers, o, all substantially as described, and for the purpose set forth.

3. In combination, the cross-head a, the pivoted arms c, the spiral springs e, the arms f, wholly supported against the outward pressure of said springs by said cross-head, and the two series of independently-acting burnishers o, borne on the arms c and provided with separate spring action, all substantially as described, and for the purpose set forth.

4. In combination, the cross-head a, the pivoted arms c, bearing the fixed burnishers d, the spiral springs e, the arms f, wholly supported against the outward pressure of said springs by said cross-head, and the two series of independently-acting burnishers o, borne on the arms c and provided with separate spring action, all substantially as described, and for the purpose set forth.

WILLIAM O. WAY.

Witnesses:
A. C. TANNER,
H. R. WILLIAMS.